US011756726B2

(12) United States Patent
Jitaru et al.

(10) Patent No.: US 11,756,726 B2
(45) Date of Patent: Sep. 12, 2023

(54) MAGNETIC STRUCTURES FOR LARGE AIR GAP

(71) Applicant: DELTA ELECTRONICS (THAILAND) PUBLIC CO., LTD ., Samutprakarn (TH)

(72) Inventors: Ionel Jitaru, Tucson, AZ (US); Marco Antonio Davila, Tucson, AZ (US); Andrei Savu, Bucharest (RO); Andrei Ion Radulescu, Targoviste (RO)

(73) Assignee: DELTA ELECTRONICS (THAILAND) PCL., Amphur Muang (TH)

( * ) Notice: Subject to any disclaimer, the term of this patent is extended or adjusted under 35 U.S.C. 154(b) by 0 days.

(21) Appl. No.: 16/778,738

(22) Filed: Jan. 31, 2020

(65) Prior Publication Data

US 2020/0243255 A1    Jul. 30, 2020

Related U.S. Application Data

(62) Division of application No. 13/887,345, filed on May 5, 2013, now abandoned.

(Continued)

(51) Int. Cl.
*H01F 38/14* (2006.01)
*H01F 27/34* (2006.01)
(Continued)

(52) U.S. Cl.
CPC .............. *H01F 38/14* (2013.01); *H01F 3/10* (2013.01); *H01F 27/346* (2013.01); *H01F 2003/005* (2013.01)

(58) Field of Classification Search
CPC ........ H01F 5/00; H01F 3/10; H01F 2003/005; H01F 2005/027; H01F 38/14; H01F 27/28; H01F 27/346
(Continued)

(56) References Cited

U.S. PATENT DOCUMENTS 1,876,451 A    9/1932   Telefunken
4,301,404 A    11/1981  Ley
(Continued)

FOREIGN PATENT DOCUMENTS

DE    10112892 A2    10/2002
EP    0507360 A2    10/1992
(Continued)

OTHER PUBLICATIONS

European Patent Office Search Report, dated Mar. 23, 2015, 10 pages, Application No. EP 13405056.6.
(Continued)

*Primary Examiner* — Tszfung J Chan
(74) *Attorney, Agent, or Firm* — Vector IP Law Group; Robert S. Babayi (57) ABSTRACT

New and Useful magnetic structures are provided. One feature of the magnetic structures is that they are configured to help minimize the air gap reluctance, improving the magnetic structure's coupling coefficient. Another feature is that reducing the windings AC impedance of a magnetic structure is produced by shielding the winding under ears formed of magnetic material. Still another feature is that leakage inductance of a magnetic structure is reduced, by making ears with cuts which converge toward the magnetic rods that are used in the formation of the structure.

6 Claims, 12 Drawing Sheets

Related U.S. Application Data (60) Provisional application No. 61/642,764, filed on May 4, 2012.

(51) Int. Cl.
*H01F 3/10* (2006.01)
*H01F 3/00* (2006.01)

(58) Field of Classification Search
USPC .................................................. 336/200, 232
See application file for complete search history.

(56) References Cited

U.S. PATENT DOCUMENTS

| | | | | |
|---|---|---|---|---|
| 5,467,718 | A | * | 11/1995 | Shibata ................ H02J 50/40 104/286 |
| 5,815,062 | A | * | 9/1998 | Koyuhara ............... H01F 3/10 336/172 |
| 5,956,073 | A | * | 9/1999 | Jin ........................ H01F 3/10 336/160 |
| 6,499,701 | B1 | * | 12/2002 | Thornton ............... B60L 13/06 246/194 |
| 2001/0038280 | A1 | * | 11/2001 | Aizawa .................. H01F 38/14 323/355 |
| 2004/0119576 | A1 | | 6/2004 | Nakao |
| 2004/0232845 | A1 | | 11/2004 | Baarman |
| 2005/0140482 | A1 | | 6/2005 | Cheng |
| 2008/0129246 | A1 | * | 6/2008 | Morita ................... B60L 5/005 320/108 |
| 2008/0296983 | A1 | | 12/2008 | Watson |
| 2010/0308939 | A1 | | 12/2010 | Kurs |
| 2012/0025605 | A1 | | 2/2012 | Schneider |

FOREIGN PATENT DOCUMENTS

| | | | |
|---|---|---|---|
| EP | 1011187 | A1 | 6/2000 |
| EP | 1150314 | A2 | 10/2001 |
| EP | 1634366 | A1 | 3/2006 |
| EP | 2172952 | A1 | 4/2010 |
| EP | 2196351 | A1 | 6/2010 |
| GB | 2458476 | A | 9/2009 |
| JP | 09266121 | A | 10/1977 |
| JP | 09266121 | A * | 10/1997 |
| JP | 09298499 | A * | 11/1997 |
| JP | 10023689 | A * | 1/1998 |
| JP | 10341545 | A * | 12/1998 |
| JP | 2001076598 | A | 3/2001 |
| JP | 2002134340 | A * | 5/2002 |
| JP | 2004119748 | A | 4/2004 |
| JP | 2004126750 | A | 4/2004 |
| JP | 2004126750 | A * | 4/2004 |
| JP | 2009123727 | A | 6/2009 |
| JP | 2009240121 | A * | 10/2009 |
| JP | 2011142177 | A | 7/2011 |
| WO | 9511545 | A1 | 4/1995 |
| WO | 9948130 | A1 | 9/1999 |
| WO | 0116995 | A1 | 3/2001 |
| WO | 2008140333 | A2 | 11/2008 |
| WO | 2009111597 | A2 | 9/2009 |
| WO | 2010090538 | A1 | 8/2010 |
| WO | 2010090539 | A1 | 8/2010 |
| WO | 2011148289 | A2 | 12/2011 |
| WO | 2012008693 | A2 | 1/2012 |
| WO | 2012018268 | A1 | 2/2012 |

OTHER PUBLICATIONS

European Patent Office Search Report, dated Jun. 23, 2014, 8 pages, Application No. EP 13405055.8.

European Patent Office Search Report, dated Feb. 11, 2015, Application No. EP 13405054.1.

European Patent Office Search Report, dated Jan. 13, 2014, Application No. EP 13405057.4.

European Patent Office Search Report, dated Sep. 1, 2017, Application No. 17153117.1.

European Patent Office Communication Pursuant to Article 94(3) EPC, dated Jul. 9, 2015, Application No. 13 405 058.2-1556.

Phadke A G et al., "A New Measurement Technique for Tracking Voltage Phasors, Local System Frequency, and Rate of Change of Frequency", IEEE Transactions on Power Apparatus and Systems, IEEE Inc. New York, US, vol. PAS-100, No. 5, May 1, 1983 (May 1, 1983), pp. 1025-1103.

Fotopoulou K et al., "Wireless Powering of Implanted Sensors using RF Inductive Coupling",Sensors, 2006. 5th IEEE Conference ON, IEEE, PI, Oct. 22, 2006 (Oct. 22, 2006), pp. 765-768.

Budhia M et al: "A new IPI magnetic coupler for electric vehicle charging systems", ECON 2010—36th Annual Conference on IEEE Industrial Electronics Society, IEEE, Piscataway, NJ, USA, Nov. 7, 2010 (Nov. 7, 2010), pp. 2487-2492, XP031840430, NJ, USA.

Masato Chigira et al: "Small-size light-weight transformer with new core structure for contactless electric vehicle power transfer system", Energy Conversion Congress and Exposition (ECCE), 2011 IEEE, IEEE, Sep. 17, 2011 (Sep. 17, 2011), pp. 260-266, XP032067172.

\* cited by examiner

MAGNETIC STRUCTURES FOR LARGE AIR GAP

RELATED APPLICATION/CLAIM OF PRIORITY

This application is related to and claims priority from U.S. Provisional application Ser. No. 61/642,764, entitled Magnetic Structures for Large Air Gap, filed May 4, 2012, which provisional application is incorporated herein by reference.

1. INTRODUCTION

The increasing popularity of wireless power supplies has created a new set of challenges in designing the required power transformers. Large air gaps between primary and secondary decrease the coupling of the power transformer. A decrease in the transformer's coupling translates into a decrease in the overall power converter's efficiency.

Large air gaps exhibit a large magnetic path reluctance. Keeping the value of this reluctance small, determined the development of new magnetic structures and wireless power transformers. Also leakage inductance of the transformer increases with the increase of the air gap and the mutual inductance of the transformer decreases. Decreasing the gap reluctance together with minimising the leakage inductance and reducing AC copper loss in the transformer is the main purpose of large air gap magnetic structures.

This application is accompanied by FIGS. 1-13 which are reproduced and described in the description that follows.

2. PRIOR ART

A method of transferring power at a large distance is defined as Inductive Power Transfer(IPT) which is achieved through mutual coupling in a similar manner to conventional tight coupled transformers. IPT systems have coupling coefficients between 0.01 and 0.5 due to large air gaps compared to over 0.95 in transformers.

One of the most important part of an IPT system is the wireless transformer. Magnetic structures for the wireless transformer have been studied by John T. Boys and Grant A. Covic in [1].

According to [1] wireless transformers are split in 2 categories: Circular Pads [FIG. 1] or circular couplers and flat power pads [FIG. 2]. An investigation and analysis of circular pads is performed by John T. Boys and Grant A. Covic in [2].

Figure 1:
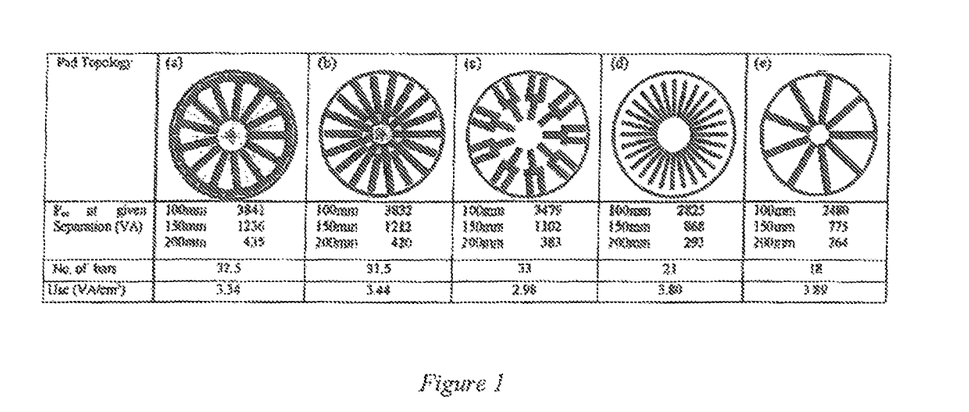
FIG. 1 shows a category of wireless transformers known as circular pads.

Circular pads also known as pot core pads are composed of a magnetic material and copper or aluminium coils. Transformer's primary and secondary are identical in shape and size. The drawback of the pot core pads is the fact that high coupling is limited by the distance between the center post and the outer circular post.

Figure 2:
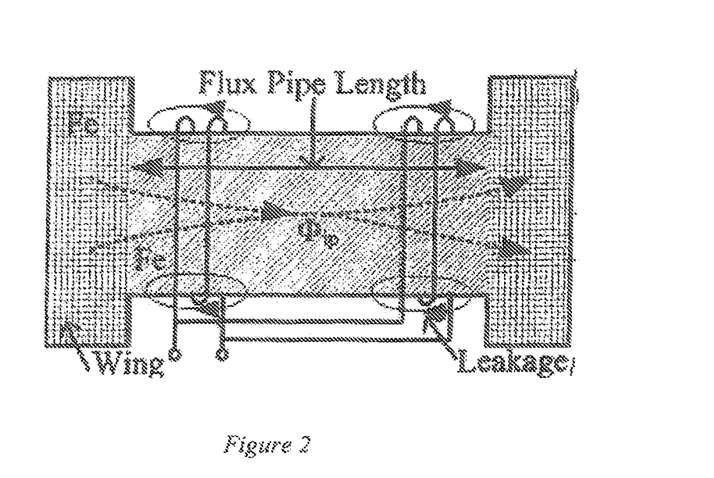
FIG. 2 shows a category of wireless transformers known as circular couplers and flat power pads.

FIG. 2 shows a flat power pad comprising a ferrite core and two parallel connected windings. The windings are wrapped around the ferrite neck. There are two separate zones for the windings. Ferrite extensions called wings are assigned on the outer edges. FIG. 2 shows the primary or secondary of the wireless transformer, where both primary and secondary sides are identical in size and shape.

Description of the Present Invention

3. C-SHAPED POWER PAD

Figure 3:
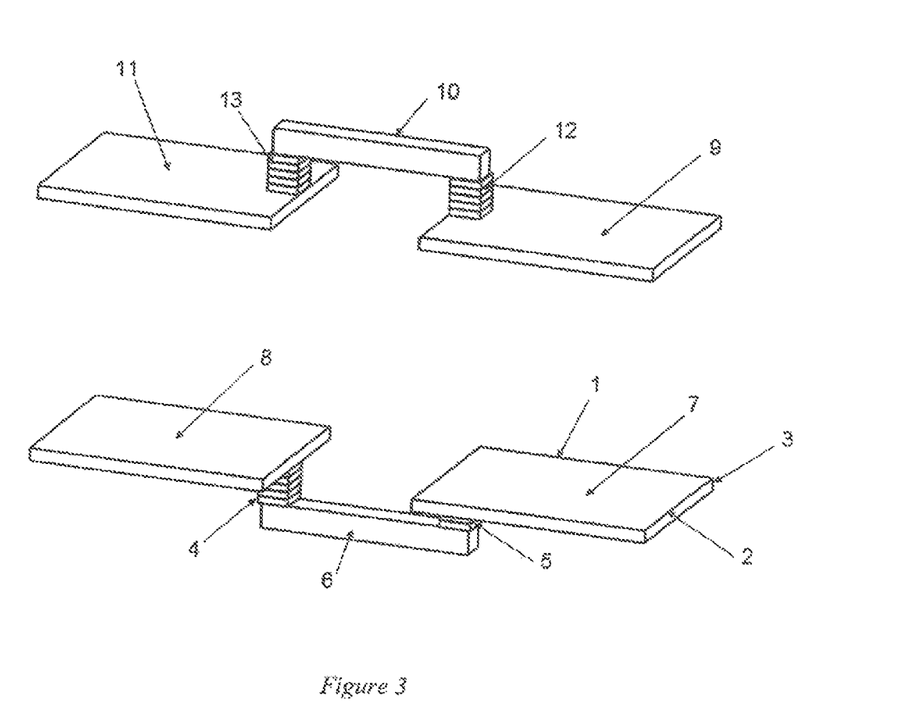
FIG. 3 shows a first magnetic structure according to the present invention.

FIG. 3 shows a first magnetic structure according to the present invention. It comprises of a primary side and a secondary side which are identical in form and size. The primary side includes a rod 6, and ears 7, 8 (which are formed of magnetic, e.g. ferrite material) and conductive windings 4, 5 (e.g. formed of copper).

The two windings are in series creating an "eight shape winding". The windings can be made of regular copper wire or litz wire. Also the shape of the wire can be circular or rectangular.

The rod and ears can be made of any high permeability magnetic material such as si-steel or ferrite.

The distance between primary and secondary assembly is defined as the magnetic air gap. The size of the ears compensate for the high reluctance resulted from a large air gap. The reluctance of the gap is equal to $$\mathfrak{R}_{gap} = \frac{l_{gap}}{\mu_{gap} \cdot Area_{gap}}$$

where $l_{gap}$ is the gap length, $\mu_{gap}$ is the permeability of the gap and $Area_{gap}$ is the area of the gap. As a result, in order to decrease the gap reluctance we can decrease the length of the gap, increase the gap permeability or increase the area of the gap. The first two options can not be accomplished from a physical point of view. Increasing the area of the gap is the only option left. The gap area is increased by increasing the magnetic ears in two dimensions: 1 and 2.

The purpose of decreasing the gap reluctance is to force the magnetic field produced by the primary to follow a desired path. Windings 4 and 5 are connected in series forming a magnetic dipole, north and south. The desired path of the magnetic field generated by the primary side is that the field lines travel from ear 8 in the rod 6, into the ear 7, through the air gap into the secondary ear 9, through the secondary rod 10, through the secondary ear 11, through the air gap and back into the primary ear 8. The secondary windings 12 and 13 are energized by this magnetic field.

Another advantage obtained by using magnetic ears in this C-shaped Power Pad is the fact that the windings 4, 5, 12, 13 are shielded from the magnetic field lines. In this shielding ease the winding AC loss is reduced resulting in a higher system efficiency.

High coupling is obtained if all the magnetic field lines follow the path described above. There are some drawbacks because not all the field lines couple to the secondary. The lines which couple to the secondary are called mutual lines and form the mutual inductance, and the lines which do not couple to the secondary are called leakage lines and form the leakage inductance.

Using the ears decreases the gap reluctance but also creates two leakage paths in the primary side. One leakage path is created between the ears 7 and 8. A second path is created between each ear 7, 8 and the rod 6. The permeability of the rod can be different from the permeability of the ears.

4. C-SHAPED POWER PAD WITH SINGLE LEG WINDING

Figure 4:
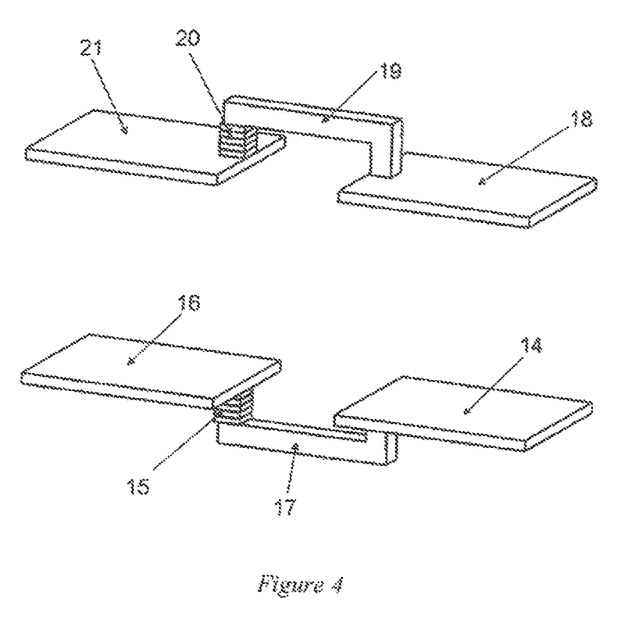
FIG. 4 shows a second version of this Invention.

FIG. 4 shows a second version of this invention. The magnetic structure comprises of two primary and secondary assemblies identical in shape and size. It is similar to the C-shaped Power Pad the only difference is that the winding is compacted onto a single leg. The reluctance analysis is the same as the C-shaped Power Pad.

The ideal magnetic path is through rod 17, ear 14, air gap, ear 18, rod 19, rod 21, air gap and ear 16. Leakage field lined exist between ear 14 and 16 and between ear 16 to rod 17.

The advantage of this design is that leakage flux from ear 14 to rod 17 is not existent because the winding does not exist in the leg below ear 14.

5. C-SHAPED POWER PAD WITH CENTER ROD WINDING

Figure 5:
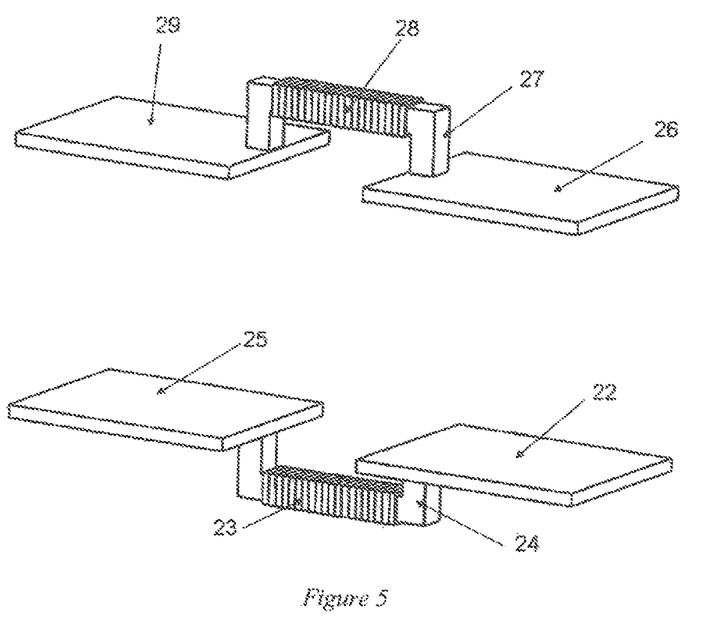
FIG. 5 shows a third version of the invention.

FIG. 5 shows a third version of the invention. The magnetic structure comprises of two primary and secondary assemblies identical in shape and size. It is similar to the C-shaped Power Pad, the only difference is that the winding is compacted on the rods 24 and 28.

The desired path of the magnetic field is through rod 24 through ear 22, through the air gap through ear 26 through rod 27 through ear 29, through the air gap and through ear 25.

The advantage of using the windings 23 and 28 on the rods 24 and 27 is that the undesired leakage flux between the ears and the rod does not exist anymore. The disadvantage is that the winding arrangement creates leakage flux on the opposite side of the gap.

6. C-SHAPED POWER PAD WITH CENTER ROD WINDING AND CIRCULAR ROD

Figure 6:
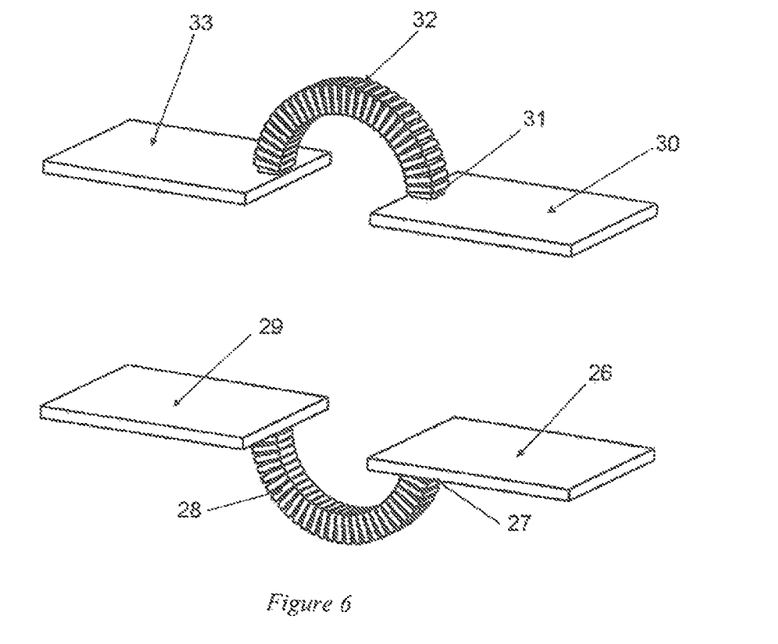
FIG. 6 shows a fourth version of the invention.

FIG. 6 shows a fourth version of the invention. The magnetic structure comprises of two primary and secondary assemblies identical in shape and size. It is similar to the C-shaped Power Pad with center rod winding. The difference is that the rods 27 and 31 have a circular shape.

The desired path of the magnetic field is from rod 28 to ear 26, through the air gap, through ear 30, through rod 31, through ear 33, through the air gap and through ear 29.

The advantage of this concept is the minimisation of the rods 27 and 31 reluctances by decreasing the average length of the rod using a circular shape.

7. C-SHAPED POWER PAD WITH MAGNETIC MATERIAL CUTOUTS

Figure 7:
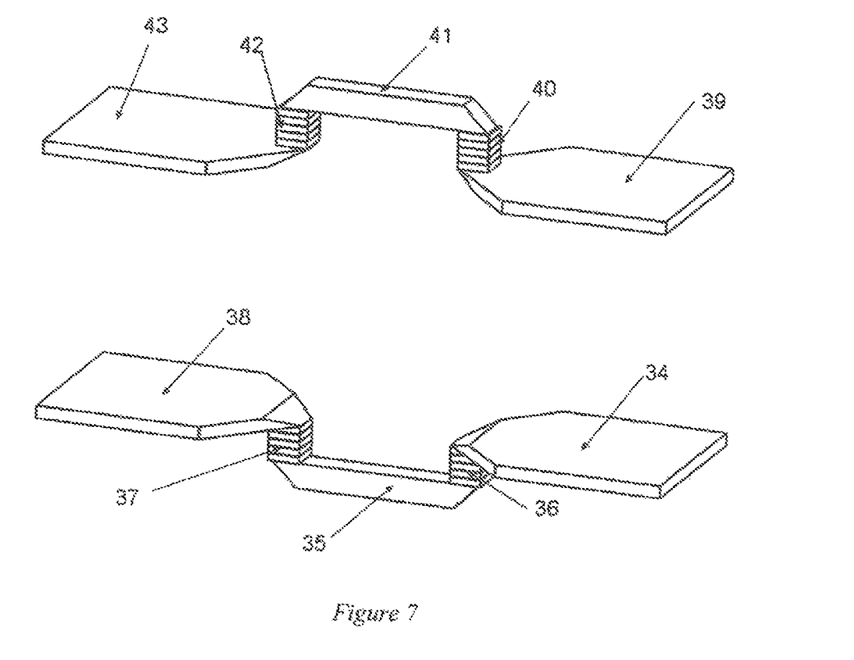
FIG. 7 shows a fifth version of the invention.

FIG. 7 shows a fifth version of the invention, the magnetic structure comprises of two primary and secondary assemblies identical in shape and size. It is similar to the C-shaped Power Pad. There are cutouts in the rods 35 and 41 and in the ears 34, 38, 39 and 43.

The desired magnetic flux path is through rod 35, through ear 34, through the air gap, through ear 39, through rod 41, through ear 43, through the air gap, through ear 38.

The advantage of this design is that the magnetic material cutouts decrease the leakage flux line between the ears 34, 38, and 39, 43. It also decreases the leakage field lines between the ears 34, 38 and the rod 35, and between the ears 39 and 43 and the rod 41.

8. SYMMETRICAL POWER PAD

Figure 8:
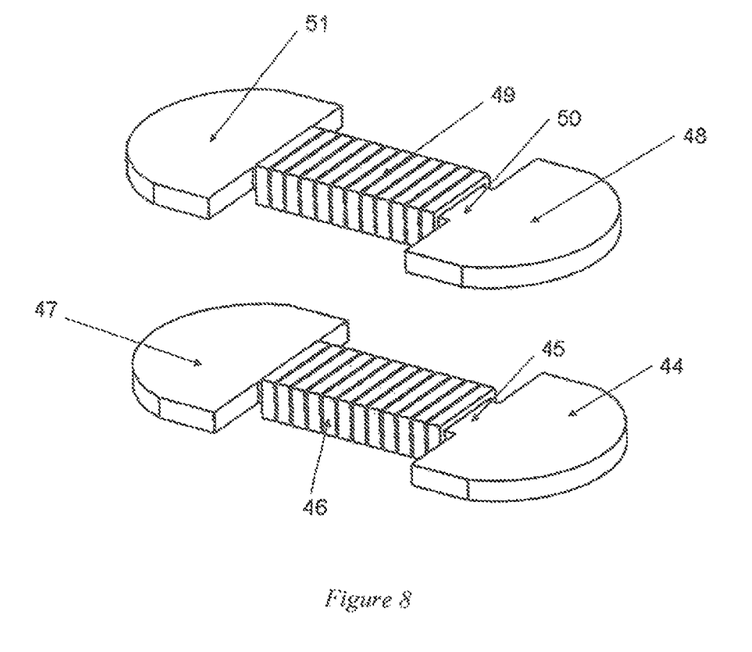
FIG. 8 shows a sixth version of the invention.

FIG. 8 shows a sixth version of the invention. The magnetic structure comprises of two primary and secondary assemblies identical in shape and size.

The primary and secondary are made of magnetic material, ferrite or si-steel, and a copper winding. The ferrite is split between two sections: the ears 44, 47 and 48, 51 and the rods 45, 50.

The windings 46, 49 are spread on the entire length of the ferrite rods 45, 50. The ferrite ears play the same role of decreasing the air gap reluctance like the C-shaped Power Pad.

The desired magnetic field path is from rod 45 through ear 44, through the air gap, through ear 48, through rod 50, through ear 51, through the air gap and through ear 47.

A disadvantage of this winding arrangement is that the windings 46 and 49 are not shielded from the magnetic field in any way, and as a result they will exhibit a high AC impedance. This will lower the system efficiency.

This arrangement creates a leakage field between ears 44 and 47 and between ears 48 and 51. This leakage field has three components: above the plane of the ears, below the plane of the ears and in the plane of the ears. Because the structure is symmetrical, the leakage field below the plane of the ears will be as intense as the leakage field above the place of the ears.

The placement of the windings 46 and 49 makes them closer to each other, and as a result some of the leakage field produced by winding 46 could be captured by secondary winding 49.

9. SYMMETRICAL POWER PAD WITH FERRITE CUTS

Figure 9:
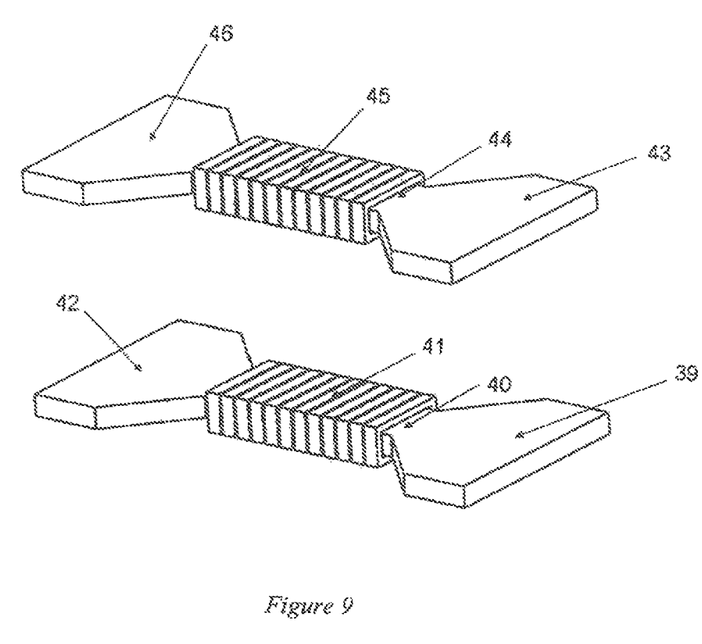
FIG. 9 shows a seventh version of the invention.

FIG. 9 shows a seventh version of the invention. The magnetic structure comprises of two primary and secondary assemblies identical in shape and size. The structure is similar to the Symmetrical Power Pad. The difference is that the ears 39, 42, 43 and 46 have cuts which converge toward the rods 40, 44.

The desired magnetic field path is from rod 40 through ear 39, through the air gap, through ear 43, through rod 44, through ear 46, through the air gap, through ear 42.

The advantage of this concept is that the leakage lines from the plane of ears 39, 42 and 43, 46 is minimised due to effective distance increase between them by the cuts which converge toward the rods 40, 44.

10. LINEAR POWER PAD

Figure 10:
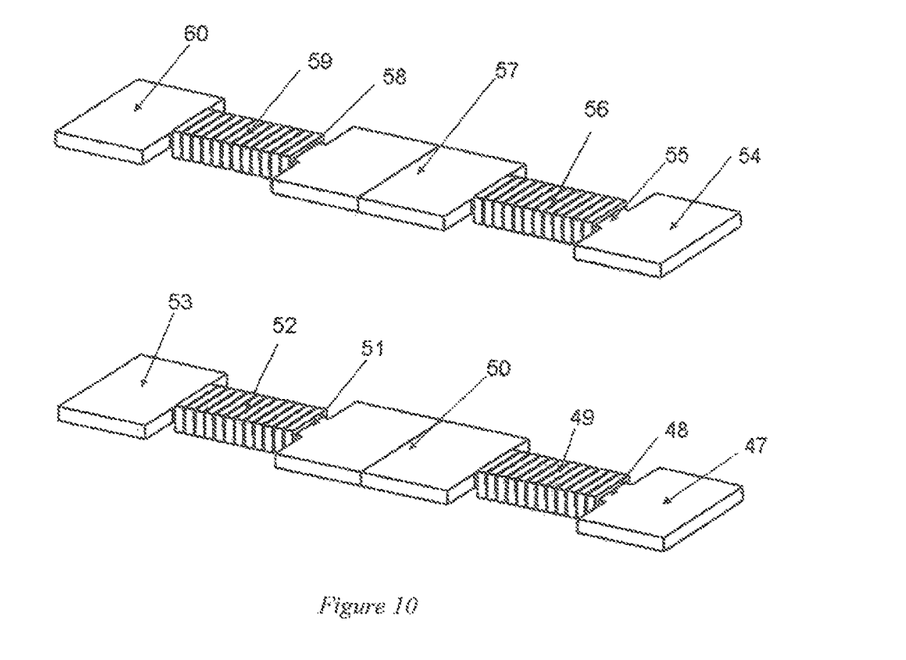
FIG. 10 shows an eighth version of the invention.

FIG. 10 shows an eighth version of the invention. The magnetic structure comprises of two primary and secondary assemblies identical in shape and size. The primary and secondary assemblies are made from magnetic material and copper windings. Each primary and secondary is made out of two windings 49, 52, 56, 59, two ferrite ears 47, 53, 54, 60, two ferrite rods 48, 51, 55, 58 and one center ferrite pad 50, 57.

Windings 49 and 52 have the polarity set that the magnetic field produced travels towards the center pad 50. For the primary side the center ferrite pad 50 becomes a magnetic field transmitter and the two outer ears 47 and 53 are the magnetic field return paths.

The desired magnetic field path from primary to secondary is: field is created by windings 49 and 52, travels from rods 48 and 51 through center pad 50, through the air gap, through center pad 57, it is split between rod 55 and rod 58, each split travels through ear 54 respectively ear 60, then through the air gap, an each split travels through return ears 47 respectively 53.

The advantage of this arrangement is that the air gap reluctance of the center pads 50, 57 is minimized due to the increase in the pads area. The total magnetic field is split between the windings 49, 52 and 56, 59. Unwanted Leakage field lines on the back side on the primary exist because of the structure primary symmetry.

11. E-SHAPED POWER PAD

Figure 11:
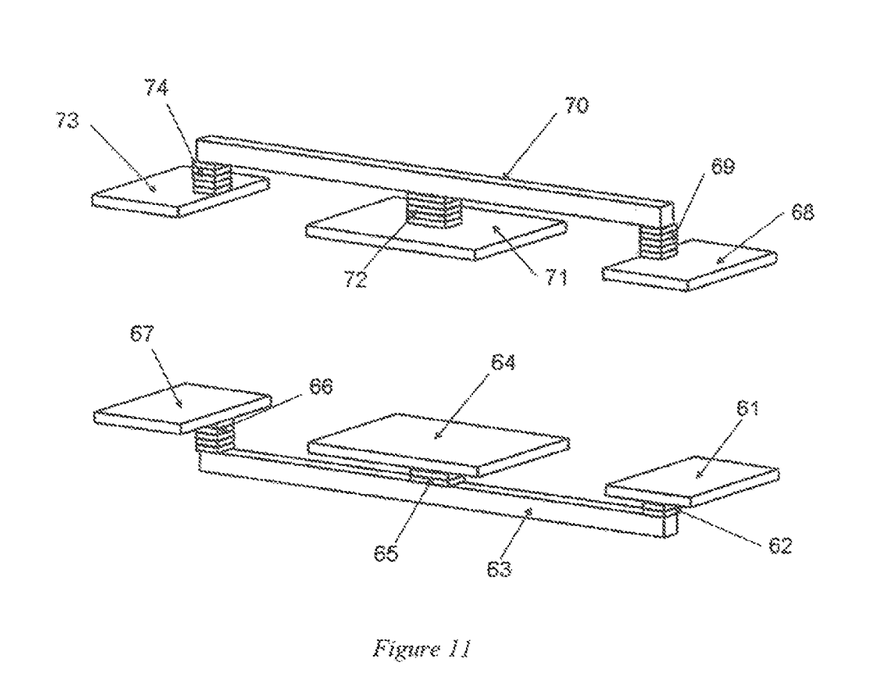
FIG. 11 shows a ninth version of the invention.

FIG. 11 shows a ninth version of the invention. The magnetic structure comprises of two primary and secondary assemblies identical in shape and size, but also can be combined with all the magnetic structures described here, and as a result will become non symmetrical primaries and secondaries.

The primary and the secondary assemblies are made of magnetic material and copper windings. The primary and secondary windings are split on three legs. The polarity of winding 65 is set that the magnetic field created is orientated towards center pad 64. Windings 62 and 66 have the polarity that the magnetic field enters the rod 63. The same winding polarity is se for the secondary side.

The desired path for the magnetic field is from center pad 64, through the air gap, through center pad 71, split into the rod 70, half of the magnetic field goes into ear 68, through the air gap, through ear 61, through rod 63, and the other half through ear 73, through the air gap, through ear 67 and through rod 63.

The advantage of this structure is that it minimizes the leakage lines between ears 61, 67 and between ears 68 and 73. Also splitting the winding into three separate sections makes the windings better shielded against the magnetic field lines. As a result, the AC impedance of the windings is reduced, resulting in a higher system efficiency.

A drawback of this assembly is that the center pad 64 has a low reluctance path to rod 63, and as a result creates unwanted leakage lines to rod 63.

12. DELTA SHAPED POWER PAD

Figure 12:
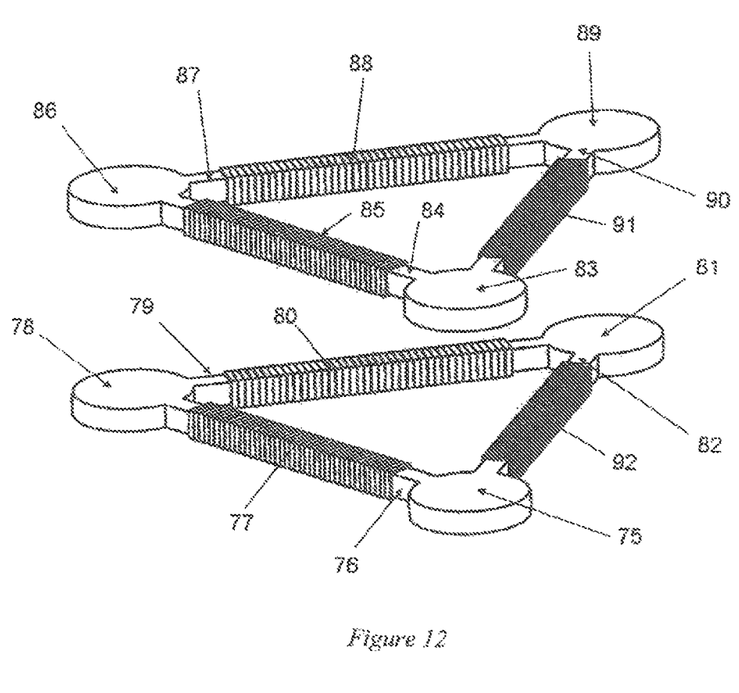
FIG. 12 shows a tenth version of the invention.

FIG. 12 shows a tenth version of the invention. The magnetic structure comprises of two primary and secondary assemblies identical in shape and size, but also can be combined with all the magnetic structures described here, and as a result will become non symmetrical primaries and secondaries. The structure can have also a C-shape connection between ears.

The primary and secondary are made of magnetic material and copper windings. The magnetic material is made up of magnetic ears 75, 78, 81, 83, 89, 86, and magnetic rods 76, 82, 79, 84, 87, 90.

There are three windings in the primary side 77, 92, 80 and three windings in the secondary side 85, 88, 91. The primary windings can be energized with 120 degree separation in phase.

At zero degree phase ears 86 and 78 will be the field return path and ears 75, 83, 81, 89 will be the transmission path. The path of the magnetic field at zero phase will be: from ear 78 will split to rod 76 and rod 79. From rod 76 will go to ear 75, through the air gap, through ear 83 through rod 84, through ear 86, through the air gap and back to ear 78. From rod 79 will go to ear 81, through the air gap, through ear 89, through rod 87, through ear 86, through the air gap and back to ear 78. At 120 degree phase ears 75 and 83 will be the field return path and ears 78, 81, 86, 89 will be the field transmission path. At 240 degree phase ears 81 and 89 will be the field return path and ears 78, 83, 86, 75 will be the field transmission path. This tri-phase system creates a rotational magnetic field between all ears.

The drawback of this assembly is that the symmetry of the primary creates unwanted leakage lines below the plane of the ears. Also the symmetry of the secondary creates unwanted leakage lines below the plane of the ears.

The windings can be arranged into multiple phases similar to the electric motors phases.

13. Y-SHAPED POWER PAD

Figure 13:
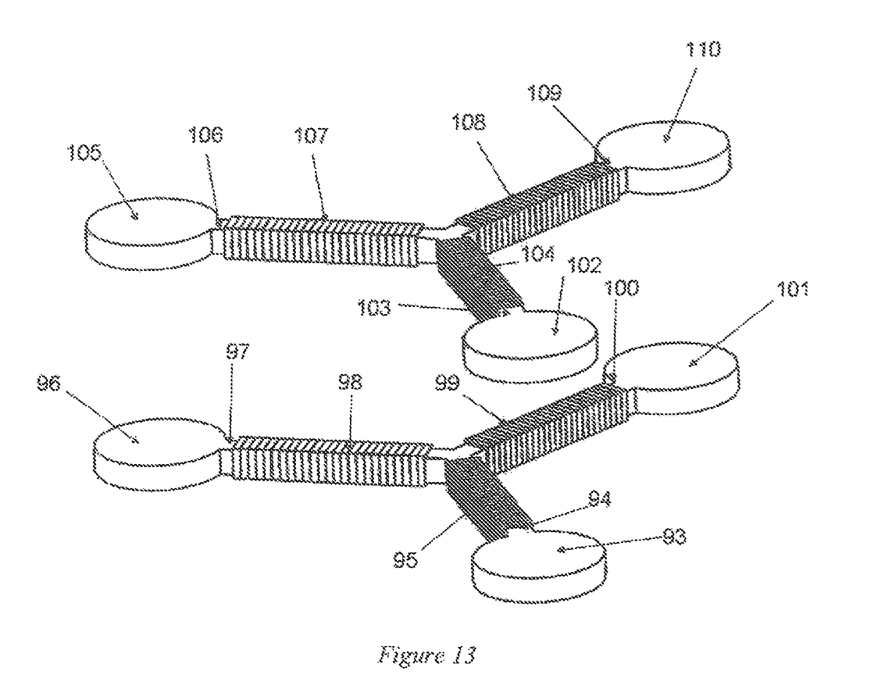
FIG. 13 shows an eleventh version of the invention.

FIG. 13 shows on eleventh version of the invention. The magnetic structure comprises of two primary and secondary assemblies identical in shape and size, but also can be combined with all the magnetic structures described here, and as a result will become non symmetrical primaries and secondaries. The structure can have also a C-shape connection between ears The primary and secondary are made of magnetic material and copper windings. The magnetic material is made up of magnetic ears 93, 96, 101, 102, 110, 105, and magnetic rods 94, 97, 100, 103, 106, 109.

There are three windings in the primary side 95, 98, 99 and three windings in the secondary side 107, 104, 108. The primary windings can be energized with 120 degree separation in phase.

At zero degree phase the magnetic field will travel from ear 96 through rod 97, through rod 94, through ear 93, through the air gap, through ear 102, through rod 103, through rod 106, through ear 105, through the air gap and back to ear 96. This trip-phase system creates a rotational magnetic field between all ears. At 120 degree phase the magnetic field will travel from ear 93 through rod 94, through rod 100, through ear 101, through the air gap, through ear 110, through rod 109, through rod 103, through ear 102, through the air gap and back to rod 93. At 240 degree phase the magnetic field will travel front ear 101 through rod 100, through rod 97, through ear 96, through the air gap, through the ear 105, through the rod 106, through the rod 109, and hack to ear 110. This trip-phase system creates a rotational magnetic field between all ears.

The drawback of this assembly is that the symmetry of the primary creates unwanted leakage lines below the plane of the ears. Also the symmetry of the secondary creates unwanted leakage lines below the plane of the ears.

The windings can be arranged into multiple phases similar to the electric motors phases.

14. SUMMARY

Thus, as seen from the foregoing description, one feature of the present invention is that the magnetic structures are configured to help minimize the air gap reluctance, improving the magnetic structure's coupling coefficient. Another feature is that reducing the windings AC impedance of a magnetic structure is produced by shielding the winding under ears formed of magnetic material. Still another feature is that leakage inductance of a magnetic structure is reduced, by making ears with cuts which converge toward the magnetic rods that are used in the formation of the structure.

The invention claimed is:

1. A magnetic structure for a wireless transformer for inductive power transfer having a primary assembly and a secondary assembly, the primary assembly including a first, a second and a centre ear, an E-shape rod with three legs wherein a first leg is linked to the first ear, a second leg is linked to the centre ear and a third leg is linked to the second ear, at least one winding is wound around one of the legs of the E-shaped rod such that magnetic field lines of a magnetic field produced by the at least one winding run from one of the first, the second and the third leg of the E-shaped rod into an air gap on a side of the first, the second and the centre ear opposite the E-shaped rod and enter another two of the first, the second and the third leg of the E-shaped rod from the air gap, wherein the first, the second and the centre ear and the E-shaped rod are made of si-steel or ferrite; and wherein the first, the second and the centre ear shield the at least one winding from electromagnetic field line, wherein the air gap entirely separates the primary assembly from the secondary assembly.

2. The magnetic structure according to claim 1, wherein the at least one winding includes three windings and wherein a first one of these three windings is wound around the first leg of the E-shaped rod, a second one of these three windings is wound around the second leg of the E-shaped rod and a third one of these three windings is wound around the third leg of the E-shaped rod.

3. The magnetic structure according to claim 2, wherein the three windings are wound around the first, the second and the third leg of the E-shaped rod such that the centre ear is a magnetic field transmitter and the first and the second ear form a magnetic field return path.

4. The magnetic structure according to the claim 1, wherein the first, the second and the centre ears have cuts which converge towards the E-shaped rod to reduce a leakage inductance of the magnetic structure.

5. The magnetic structure according to claim 1, wherein the E-shaped rod has cut outs to decrease a leakage flux between the first, the second and the centre ear and the E-shaped rod.

6. The magnetic structure according to claim 1, wherein the primary assembly and the secondary assembly are identical in shape and size.

* * * * *